US012718350B2

(12) United States Patent
Magrangeas et al.

(10) Patent No.: US 12,718,350 B2
(45) Date of Patent: Aug. 25, 2026

(54) METHOD FOR DETECTING AT LEAST ONE DEFECT ON A SUPPORT, DEVICE AND COMPUTER PROGRAM ASSOCIATED

(71) Applicant: AQC INDUSTRY, Champs-sur-Marne (FR)

(72) Inventors: Pierre Magrangeas, Paris (FR); Christian Bracich, Trieste (IT); Wilson Veloz Parra, Rouen (FR); Stéphanie Pottecher, Luisant (FR); Benoît Berthelier, Clamart (FR); Omar Chimère Ndiaye, Paris (FR); Adrien Binet, Lyons (FR); Caroline Senac, Le Kremlin Bicetre (FR); Nicolas Toussaint, Paris (FR); Renard Zélia Ferret, Gagny (FR); Carlo Dri, Trieste (IT); Igor Zerjal, Trieste (IT)

(73) Assignee: AQC INDUSTRY, Champs-sur-Marne (FR)

( * ) Notice: Subject to any disclaimer, the term of this patent is extended or adjusted under 35 U.S.C. 154(b) by 260 days.

(21) Appl. No.: 18/697,208

(22) PCT Filed: Sep. 29, 2022

(86) PCT No.: PCT/EP2022/077179
§ 371 (c)(1),
(2) Date: Mar. 29, 2024

(87) PCT Pub. No.: WO2023/052537
PCT Pub. Date: Apr. 6, 2023

(65) Prior Publication Data

US 2025/0045905 A1 Feb. 6, 2025

(30) Foreign Application Priority Data

Oct. 1, 2021 (EP) .................................... 21315194

(51) Int. Cl.
*G06T 7/00* (2017.01)
*G01N 21/88* (2006.01)
(Continued)

(52) U.S. Cl.
CPC ....... *G06T 7/0008* (2013.01); *G01N 21/8851* (2013.01); *G01N 21/89* (2013.01);
(Continued)

(58) Field of Classification Search
CPC ..................... G06T 7/0008; G06T 3/40; G06T 2207/30132; G06T 5/92; G01N 21/8851;
(Continued)

(56) References Cited

U.S. PATENT DOCUMENTS 5,774,177 A * 6/1998 Lane .................... G01N 33/367 382/111
12,394,033 B2 * 8/2025 Xu ......................... G06N 3/045
(Continued)

FOREIGN PATENT DOCUMENTS

CN 107341499 A 11/2017
CN 111047655 A 4/2020
(Continued)

OTHER PUBLICATIONS

Chan, Chi-ho, and Grantham KH Pang. "Fabric defect detection by Fourier analysis." IEEE transactions on Industry Applications 36.5 (2000): 1267-1276. (Year: 2000).*
(Continued)

*Primary Examiner* — Utpal D Shah
(74) *Attorney, Agent, or Firm* — CUSHMAN PARTNERS, LLC

(57) ABSTRACT

A method for detecting at least one defect on a support such as a fabric or a brick, the method includes acquiring at least one first image of the support; generating a second image that corresponds to the 2D spectrum space of the at least one
(Continued)

first image; shifting at least one selected frequency range from at least a first area of the 2D spectrum space toward a second area of the 2D spectrum space; filtering at least one frequency range of the 2D spectrum space to remove at least one predefined pattern of the support; shifting at least a selected frequency range from a second area of the new 2D spectrum space toward a first area of the new 2D spectrum space; and reversing the transformation of the frequency domain of the new 2D spectrum space to obtain a final image.

16 Claims, 8 Drawing Sheets

(51) Int. Cl.
*G01N 21/89* (2006.01)
*G06T 3/40* (2024.01)
*G06V 20/70* (2022.01)

(52) U.S. Cl.
CPC ................ *G06T 3/40* (2013.01); *G06V 20/70* (2022.01); *G01N 2021/888* (2013.01); *G06T 2207/30132* (2013.01)

(58) Field of Classification Search
CPC ............. G01N 21/89; G01N 2021/888; G01N 21/8983; G06V 20/70
See application file for complete search history.

(56) References Cited

U.S. PATENT DOCUMENTS

2002/0054293 A1* 5/2002 Pang .................... G01N 21/898 356/430
2020/0025690 A1* 1/2020 Koshihara ........... G06F 18/2433
2023/0142383 A1* 5/2023 Zhang .............. G06Q 10/06395

FOREIGN PATENT DOCUMENTS

CN 109934802 B 6/2021
WO WO-2013049090 A1 * 4/2013 ............. G01N 21/89
WO WO 2020/092509 A1 5/2020
WO WO-2021067518 A1 * 4/2021 ............... G06T 3/40

OTHER PUBLICATIONS

Sari-Sarraf, Hamed, and James S. Goddard Jr. "Online optical measurement and monitoring of yarn density in woven fabrics." Automated Optical Inspection for Industry. vol. 2899. SPIE, 1996. (Year: 1996).*

Kumar, Ajay. "Computer-vision-based fabric defect detection: A survey." IEEE transactions on industrial electronics 55.1 (2008): 348-363. (Year: 2008).*

International Search Report as issued in International Patent Application No. PCT/EP2022/077179, dated Jan. 5, 2023.

|Sakhare, K., et al., "Spectral and spatial domain approach for fabric defect detection and classification," 2015 International Conference On Industrial Instrumentation and Control (ICIC), IEEE, May 2015, XP033170667, pp. 640-644.

Liu, G., et al., "Fabric defect detection based on information entropy and frequency domain saliency," Visual Computer, vol. 37, No. 3, Feb. 2020, XP037403178, pp. 515-528.

Jing, Jun-Feng, et al., "Automatic fabric defect detection using a deep convolutional neural network," Coloration Technology 135.3 (Year: 2019): 213-223.

First Examination Report as issued in Indian Patent Application No. 202417025503, dated May 15, 2026.

* cited by examiner

METHOD FOR DETECTING AT LEAST ONE DEFECT ON A SUPPORT, DEVICE AND COMPUTER PROGRAM ASSOCIATED

CROSS-REFERENCE TO RELATED APPLICATIONS

This application is the U.S. National Stage of PCT/EP2022/077179, filed Sep. 29, 2022, which in turn claims priority to European patent application number 21315194.7 filed Oct. 1, 2021. The content of these applications are incorporated herein by reference in their entireties.

FIELD OF THE DISCLOSURE

The present disclosure relates to the technical field of methods for automatically detecting defects on a support implying learning functions such as neural networks. More particularly, the present disclosure relates to methods for detecting defects on a support such as a fabric or a brick, said support comprising patterns.

BACKGROUND

In the textile industry, all over the world, the quality of the textile produced has always been a major issue, in order to ensure the satisfaction of customers. Currently, a significant part of the quality control processes on the production lines is ensured through manual vision, which strongly depends on the skills, vision, and tiredness of the workers. As a result, a good accuracy in defect detection cannot be guaranteed. Moreover, reviewing the fabrics through manual vision is time consuming and requires a lot of personnel depending on the number of fabrics to be inspected. With the rapid increase of the production quantity and the production speed of textile fabrics, the manual vision detection can no longer be relied on to ensure a good defect detection over time.

There exist methods in the prior art that involve technological components to detect defects more precisely. It is the case with the method of patent application CN111047655, which describes a high-definition camera cloth defects detection method based on convolutional neural network. It is also the case with the method described in patent application WO2020092509. In this method, an image of a fabric on a loom is acquired and used to generate an input image that is then processed with a machine learning model, in order to detect defects within the input image. Those technologies have the disadvantage that they are lacking precision in defect positioning. Yet, the more the degree of precision of defect detection is improved, the more the amount of fabric to be discarded is minimized. Another drawback of the methods described in the prior art is that they do not allow to execute any specific actions in response to the defect detection, for example corrective actions.

Aiming at the improvement requirements of the prior art, the invention provides a method for detecting at least one defect on a support, such as a fabric or a brick, an associated device, and an associated computer program.

SUMMARY

To achieve the above object, according to one aspect of the present invention, there is provided a method for detecting at least one defect on a support, the method comprising:

- Acquiring at least one first image of the support;
- Generating an image that corresponds to the 2D spectrum space of the at least one first image;

- Filtering at least one frequency range of the 2D spectrum space to remove at least one predefined pattern of the support;
- Shifting at least one selected frequency range ([a; b]) from at least a first area of the 2D spectrum space toward a second area of the 2D spectrum space;
- Resizing the 2D spectrum space in order to generate a new 2D spectrum space on a new spectrum range in order to increase the spectrum power relatively to the full power density of the 2D spectrum space in the second area and/or its vicinity by applying at least one step among the following steps:
  - Downscaling or cropping the first image to output a desired downscaled image, respectively a cropped image or;
  - Upscaling or enlarging the first image with a margin or padding to output a desired upscaled image, respectively an enlarged image;
- Shifting at least a selected frequency range from a second area of the new 2D spectrum space toward a first area of the new 2D spectrum space;
- Reversing the transformation of the frequency domain of the new 2D spectrum space to obtain a final image;
- Detecting at least one defect on the final image,
- Labelling each defect of the first image, said labelling being applied with pixel precision,
- Generating at least one command after detecting the at least one defect.

One advantage is to efficiently detect the presence of different types of defect on a support and their precise location.

In one embodiment, the command generated after detecting the at least one defect comprises at least one of the following:

- Displaying the at least one defect on a screen;
- Lighting/pointing the at least one defect with a light device;
- Generating an alarm by emitting a digital sound and/or lighting a visual alert;
- Automatically logging to a distant server and generating a digital notification comprising at least the spatial coordinate of at least one defect;
- Stopping a machine;
- Automatically fixing the at least one defect;
- Marking/labelling the at least one defect with an automatic robot;
- Blowing the at least one defect,
- Automatically cutting, removing, rejecting, or avoiding a part of the support,
- Brushing the at least one defect.

One advantage is to adapt the command depending on the type of defect that has been detected. Another advantage is to point a defect to allow an operator to locate it and fix it. Another advantage is to fix a defect automatically when possible.

In one embodiment, the method comprises:

- Acquiring frame dimensions of at least the lateral edges of the support;
- Calculating a defect map within the frame dimension by assigning to each defect a location within the frame dimension.

One advantage is to precisely visualize the position of all the defects according to the frame dimension of the fabric.

In one embodiment, the method comprises a step of applying at least one learning function to the at least one first image to output at least one probability associated to the at least one defect detected in the image, said at least one probability being associated to a class of a classifier.

One advantage is to train a function with input data in order to improve the automatic defect detection. Another advantage is to improve the defect type identification to classify each defect detected on a support according to its features.

In one embodiment, the at least one learning function is being trained by means of a supervised method or by means of an unsupervised method.

In one embodiment, the probability associated to the at least one defect is a probability that the defect comprises a hole, a broken thread, a broken warp, a broken weft, or a crease.

One advantage is to identify the type of defects that are the most susceptible to appear on a fabric.

In one embodiment, the type of command generated depends on the classification of the defect detected on the support.

One advantage is to adapt the command in order to point or fix the defect in the most effective way depending on its type.

In one embodiment, the at least one predefined pattern comprises whether:

A stitch, said stitch being characterized by a repetition or a symmetric geometrical shape, A junction pattern between several pieces of fabric.

One advantage is that the filtered predefined pattern comprises features with high frequency on the first image, that can easily be removed to detect more precisely the presence of one or several defects.

In this case, the junction may comprise patterns defined by a sewing, a seam, or a couture. This pattern may be regular or irregular.

In one embodiment, the at least one predefined pattern comprises a repetitive printed motif, said repetitive motif being defined by colorimetric features and/or geometrical features on the support.

One advantage is that one of the filtered predefined patterns is repeated with a high frequency on the first image and can be removed by filtering the high frequencies on the first image.

In one embodiment, the method comprises the following steps:

Automatically computing at least one motif margin, said motif margin comprising at least one distance measurement separating two printed motifs;

Automatically computing a first support margin, said first support margin comprising at least one distance measurement between a longitudinal edge of the support and at least one point the printed motif;

Automatically computing a second fabric margin, said second fabric margin comprising at least one distance measurement between a lateral edge of the support and at least one point of the printed motif;

Generating a reconstructed image of the support by aggregating each printed motif and the stitch, said reconstructed image having proportional dimensions with the frame dimensions, Generating a digital image of the support by superposing the defects map and the reconstructed image within the frame dimensions.

One advantage is to obtain a final digital representation of the support that comprises all the identified defects and their location onto the support.

According to another aspect, the invention relates to a device for detecting at least one defect on a support, said device comprising:

At least one camera for acquiring at least one first image of the fabric and for detecting at least one margin information and one dimension of the fabric;

A calculator for:

Generating an image that corresponds to the 2D spectrum space of the at least one first image;

Filtering at least one frequency range of the 2D spectrum space to remove at least one predefined pattern of the support;

Shifting at least one selected frequency range from at least a first area of the 2D spectrum space toward a second area of the 2D spectrum space;

Resizing the 2D spectrum space in order to generate a new 2D spectrum space on a new spectrum range in order to increase the spectrum power relatively to the full power density of the 2D spectrum space in the second area and/or its vicinity by applying at least one step among the following steps:

i. Downscaling or cropping the first image ($FFT_1$) to output a desired downscaled image, respectively a cropped image or;

ii. Upscaling or enlarging the first image ($FFT_1$) with a margin or padding to output a desired upscaled image, respectively an enlarged image;

Shifting at least a selected frequency range from a second area of the new 2D spectrum space toward a first area of the new 2D spectrum space;

Reversing the transformation of the frequency domain of the new 2D spectrum space to obtain a final image;

Detecting at least one defect on the final image,

Labelling each defect of the first image, said labelling being applied at pixel precision, Generating at least one command after detecting the at least one defect.

At least one communication interface for exchanging data with a distant equipment.

According to another aspect, the invention relates to a computer program comprising instructions which, when said computer program is executed on a computer, leads it to execute the following steps:

Generating an image that corresponds to the 2D spectrum space of the at least one first image;

Filtering at least one frequency range of the 2D spectrum space to remove at least one predefined pattern of the support;

Shifting at least one selected frequency range from at least a first area of the 2D spectrum space toward a second area of the 2D spectrum space;

Resizing the 2D spectrum space in order to generate a new 2D spectrum space on a new spectrum range in order to increase the spectrum power relatively to the full power density of the 2D spectrum space in the second area and/or its vicinity by applying at least one step among the following steps:

Downscaling or cropping the first image ($FFT_1$) to output a desired downscaled image, respectively a cropped image or;

Upscaling or enlarging the first image ($FFT_1$) with a margin or padding to output a desired upscaled image, respectively an enlarged image;

Shifting at least a selected frequency range from a second area of the new 2D spectrum space toward a first area of the new 2D spectrum space;

Reversing the transformation of the frequency domain of the new 2D spectrum space to obtain a final image.

In one embodiment, the computer program comprises instructions which, when said computer program is executed on a computer, leads it to execute the following steps:

- Automatically computing at least one motif margin, said motif margin comprising at least one distance measurement separating two printed motifs;
- Automatically computing a first support margin, said first support margin comprising at least one distance measurement between a longitudinal edge of the support and at least one point the printed motif;
- Automatically computing a second fabric margin, said second fabric margin comprising at least one distance measurement between a lateral edge of the support and at least one point of the printed motif;
- Generating a reconstructed image of the support by aggregating each printed motif and the stitch, said reconstructed image having proportional dimensions with the frame dimensions,
- Generating a digital image of the support by superposing the defects map and the reconstructed image within the frame dimensions.

The invention also relates to a method for detecting at least one defect on a support such as a fabric or a brick, the method comprising:

- Acquiring at least one first image of the support;
- Generating a first two-dimensional spectrum space of the at least one first image, the first two-dimensional spectrum space comprising a two-dimensional spectral representation of the frequencies that characterize the features of the first image;
- Filtering at least one frequency range of the first two-dimensional spectrum space to remove at least one predefined pattern;
- Selecting at least one first frequency range in the first two-dimensional spectrum space;
- Shifting the selected frequency range from at least a first area of the first two-dimensional spectrum space toward a second area of the first two-dimensional spectrum space;
- Resizing the first two-dimensional spectrum space;
- Generating a second two-dimensional spectrum space on a second frequency range by applying at least one step among the following steps:
  - Downscaling or cropping the first image to output a desired downscaled image, respectively a cropped image or;
  - Upscaling or enlarging the first image with a margin or padding to output a desired upscaled image, respectively an enlarged image;
- Selecting a third frequency range in the second two-dimensional spectrum space
- Shifting the third frequency range from a second area of the second two-dimensional spectrum space toward a first area of the second two-dimensional spectrum space;
- Reversing the transformation of the frequency domain of the second two-dimensional spectrum space to obtain a final image;
- Detecting at least one defect on the final image,
- Labelling each defect on the first image,
- Generating at least one command after detecting the at least one defect.

In one embodiment, the command comprises marking an edge of the support with a code encoding a position of the defect on the support and encoding a classification associated to the defect.

One advantage is to allow a user to access easily to a location of a defect as well as features of a defect such as a classification or a type and determine an action to initiate relatively to the defect.

In one embodiment, the method comprises a step of applying at least one learning function to the first image to output at least one probability associated to the defect detected in the first image, said probability being associated to a class of a classifier.

One advantage is to determine a probability that the defect belongs to a particular class and to determine whether it is fixable or not.

In one embodiment, the command generated depends on class associated to the highest probability associated with the defect detected on the support.

One advantage is to initiate the most appropriate command depending on a class to which the defect has the most probability to belong.

In one embodiment, the probability associated to the defect is a probability that the defect is a fixable defect or a non-fixable defect.

One advantage is to determine what type of command should be initiate on the support.

Another advantage is to determine whether a given piece of support is acceptable or not, depending on a ratio of fixable and non-fixable defects.

In one embodiment, the command comprises at least one of the following:

- Displaying the at least one defect on a screen;
- Lighting/pointing the at least one defect with a light device;
- Generating an alarm by emitting a digital sound and/or lighting a visual alert;
- Automatically logging to a distant server and generating a digital notification comprising at least the spatial coordinate of at least one defect;
- Stopping a machine;
- Automatically fixing the at least one defect;
- Marking/labelling the at least one defect with an automatic robot;
- Blowing the at least one defect;
- Automatically cutting, removing, rejecting or avoiding at least a part of the support,
- Brushing the at least one defect.

In one embodiment, the method comprises:

- Acquiring frame dimensions of at least the lateral edges of the support;
- Calculating a defects map within the frame dimension by assigning to each defect a location within the frame dimension.

One advantage is to precisely localize the defects according to a known reference.

In one embodiment, at least one pattern comprises:

- A stitch characterized by a repetition of a shape or by a symmetric geometrical shape;
- A junction pattern between several pieces of the support.

In one embodiment, the at least one predefined pattern comprises a repetitive printed motif defined by colorimetric features and/or geometrical features.

In one embodiment, the method comprises the following steps:

Automatically computing at least one motif margin, said motif margin comprising at least one distance measurement separating two printed motifs;

Automatically computing a first support margin, said first support margin comprising at least one distance measurement between a longitudinal edge of the support and at least one point the printed motif;

Automatically computing a second fabric margin, said second fabric margin comprising at least one distance measurement between a lateral edge of the support and at least one point of the printed motif;

Generating a reconstructed image of the support by aggregating each printed motif and the stitch, said reconstructed image having proportional dimensions with the frame dimensions, Generating a digital image of the support by superposing the defects map and the reconstructed image within the frame dimensions.

In one embodiment, the method comprises a step of applying a learning function by means of a calculator to calculate a score of likeness between at least two defects belonging to at least two different categories in order to classify said two defects in a same new category, the score of likeness being calculated according to common features of the defects.

One advantage is to group classes of defects in bigger classes, such as fixable or non fixable.

In one embodiment, the labelling of each defect on the first image is done with pixel precision.

According to another aspect, the invention relates to a device for detecting at least one defect on a fabric, said device comprising:

At least one camera for acquiring at least one first image of the support and for detecting at least one margin information and one dimension of the fabric;

A calculator for:

Generating an image that corresponds to a first two-dimensional spectrum space of the at least one first image;

Filtering at least one frequency range of the first two-dimensional spectrum space to remove at least one predefined pattern of the support;

Selecting at least one first frequency range on the first two-dimensional spectrum space;

Shifting the selected first frequency range from at least a first area of the first two-dimensional spectrum space toward a second area of the first two-dimensional spectrum space;

Resizing the first two-dimensional spectrum space by applying at least one step among the following steps:

Downscaling or cropping the first image to output a desired downscaled image or;

Upscaling or enlarging the first image with a margin or padding to output a desired enlarged image;

Generating a second two-dimensional spectrum space on a second frequency range;

Selecting a third frequency range in the second two-dimensional spectrum space;

Shifting the selected frequency range from a second area of the second two-dimensional spectrum space toward a first area of the second two-dimensional spectrum space;

Reversing the transformation of the frequency domain of the second two-dimensional spectrum space to obtain a final image;

Detecting at least one defect on the final image;

Labelling each defect on the first image, said labelling being applied at pixel precision, Generating at least one command after detecting the at least one defect.

At least one communication interface for exchanging data with a local equipment, a distant equipment or a server.

According to another aspect, the invention relates to a computer program comprising instructions which, when said computer program is executed on a computer, leads it to execute the following steps:

Generating an image that corresponds to a first two-dimensional spectrum space of the at least one first image;

Filtering at least one frequency range of the first two-dimensional spectrum space to remove at least one predefined pattern of the support;

Selecting at least one first frequency range in the first two-dimensional spectrum space;

Shifting at least one selected first frequency range from at least a first area of the first two-dimensional spectrum space toward a second area of the first two-dimensional spectrum space;

Resizing the first two-dimensional spectrum space by applying at least one step among the following steps:

Downscaling or cropping the first image to output a desired downscaled image or;

Upscaling or enlarging the first image with a margin or padding to output a desired enlarged image;

Generating a second two-dimensional spectrum space on a second frequency range;

Selecting at least one third frequency range in the second frequency range;

Shifting the third frequency range from a second area of the second two-dimensional spectrum space toward a first area of the second two-dimensional spectrum space;

Reversing the transformation of the frequency domain of the second two-dimensional spectrum space to obtain a final image.

In one embodiment, the computer program comprises instructions which, when said computer program is executed on a computer, leads it to execute the following steps:

Automatically computing at least one motif margin, said motif margin comprising at least one distance measurement separating two printed motifs;

Automatically computing a first support margin, said first support margin comprising at least one distance measurement between a longitudinal edge of the support and at least one point the printed motif;

Automatically computing a second fabric margin, said second fabric margin comprising at least one distance measurement between a lateral edge of the support and at least one point of the printed motif, Generating a reconstructed image of the support by aggregating each printed motif and the stitch, said reconstructed image having proportional dimensions with the frame dimensions;

Generating a digital image of the support by superposing the defects map and the reconstructed image within the frame dimensions.

DETAILED DESCRIPTION

Figure 1:
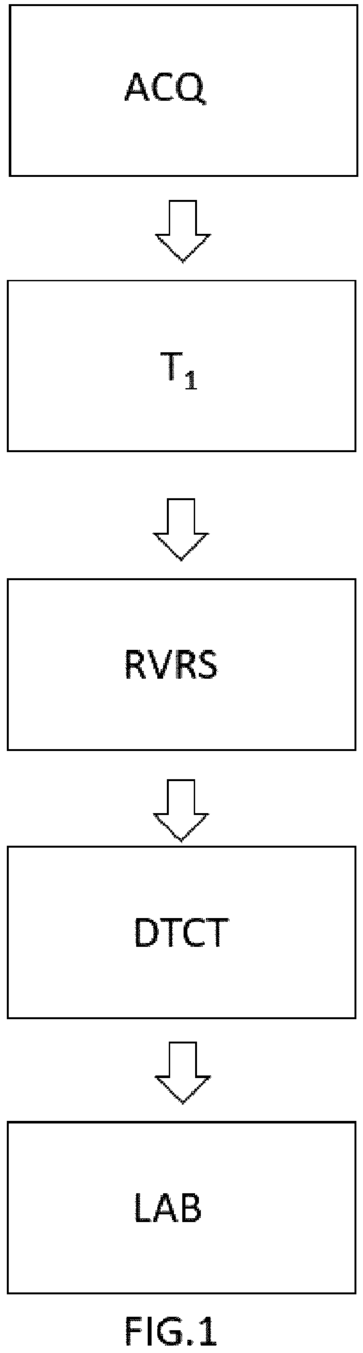
FIG. 1 is a flowchart of the steps of the methods for detecting a defect in a fabric or a brick.

In order to make the objects, technical solutions, and advantages of the present invention more apparent, the present invention is described in further detail below with reference to the accompanying drawings. It should be understood that the specific embodiments described herein are merely illustrative of the invention and are not intended to limit the invention.

According to one aspect of the invention, is provided a method for detecting at least one defect 10 on a surface such as a fabric 100 or a brick 101.

Definitions

In further description, some of the following definitions are used.

It should be understood by the term "defect" an anomaly or singularity to be detected on the support 100. The defects 10 can comprise different types of defects. For example, the defects 10 can comprise finishing defects such as water damage or clip mark, pattern defects such as broken patterns or color misdraw, isolated defects such as knots or oil spots, or printing defects such as color out or snaps. The defect 10 is for example directly linked to the conception of the fabric itself. Such defect 10 can comprise, by way of examples, holes, broken threads, broken warps, broken wefts, creases, and other sundry anomalies. In other examples, the defect 10 is not directly linked to the conception of the support 100. Such defects can comprise, by way of examples, stains, dust, or dirt.

It should be understood by the term "predefined pattern" the repeating of an element or motif. Three levels of patterns $P_a$, $P_{a1}$, and $P_{a2}$ are described in the following description. The predefined pattern $P_a$ refers to the repetitive arrangement of threads that defines the support 100, such as for example a mesh or a stitch. The predefined pattern $P_{a1}$ refers to the pattern that is printed on the support 100. Such patterns can comprise, for example, geometric patterns such as repeated geometric shapes, or organic patterns such as realistic patterns or stylized. For example, the predefined pattern $P_{a1}$ can comprise checkered pattern, striped pattern, abstract pattern, adaptation pattern, airbrush pattern, allover pattern, animal pattern or floral pattern. The predefined pattern $P_{a2}$ refers to the pattern of cutting of the support 100. For example, in order to use the fabric for specific purpose such as creating a given number of clothes, the fabric has to be cut to specific dimensions. Therefore, the roll of fabric is cut according to said specific dimensions, resulting in a plurality of similar pieces of fabric that corresponds to the predefined pattern $P_{a2}$. Thus, a given fabric can comprise different levels of patterns. Those types of patterns are referred to by the designation "predefined pattern $P_a$, $P_{a1}$ and $P_{a2}$" in the present description.

According to the first aspect of the invention, it is provided a method for detecting at least one defect 10 on a support 100.

For clarity of writing, further description will be written based on the example of a fabric. However, it should be understood that all further embodiments described could be applied to any support 100 on which defects could emerge, such as for example a brick or a wood board.

Acquiring the First Image

In one embodiment, in reference to FIG. 1, the method comprises acquiring a first image $IM_1$ of the support 100.

It should be understood by the term "first image $IM_1$" an image intended for being processed, in order to detect one or several potential defects 10 on the fabric 100. The first image $IM_1$ is for example acquired by means of one or several camera(s).

At least one camera may be an infrared camera. One advantage is to visualize the defects more clearly on the first image $IM_1$ by suppressing the patterns of the support 100 of the first image $IM_1$.

In one embodiment, the first image ($IM_1$) is acquired at a given frequency.

In one embodiment, the first image ($IM_1$) is acquired at a variable rate, for example depending on the motion of the fabric. Indeed, the images are not necessarily acquired at a given frequency, since the scrolling speed of the fabric 100 may vary under certain conditions. Those conditions are for example an operator stopping the machine or slowing down the scrolling of the fabric 100. In one illustrative example, the fabric 100 is being moved along a horizontal path by a standalone machine comprising motoring means to drive the fabric along its path. In one embodiment, several cameras are arranged above the horizontal path of the fabric, and acquire first images $IM_1$ of the fabric at a specific rate dictated by the motion of the fabric. The cameras comprise for example a communication interface $INT_1$ to send the acquired first images $IM_1$ to a distant entity such as a server $SERV_1$, where said first images $IM_1$ are processed, in order to detect potential defects 10 onto the fabric.

Figure 2:
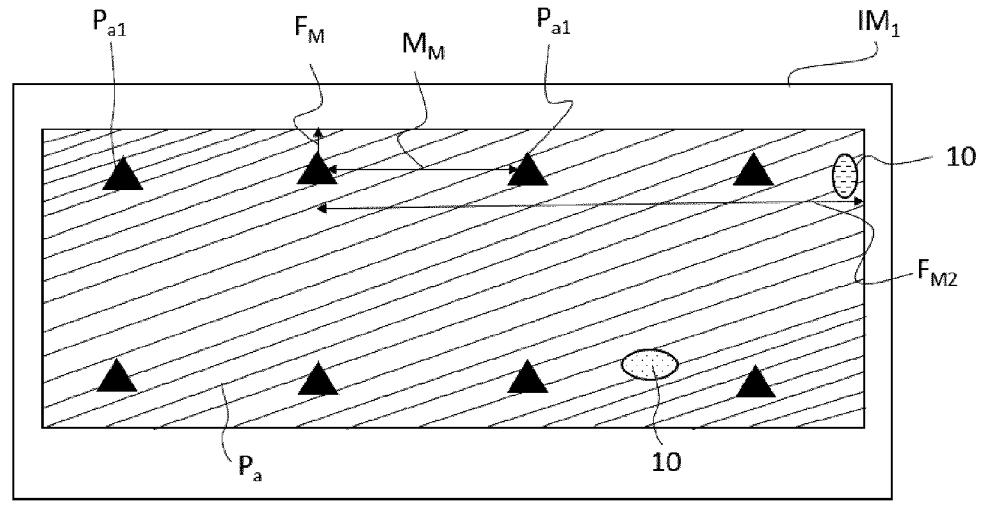
FIG. 2 is a representation of an acquired image of a fabric comprising a predefined pattern and a defect.
Figure 3:
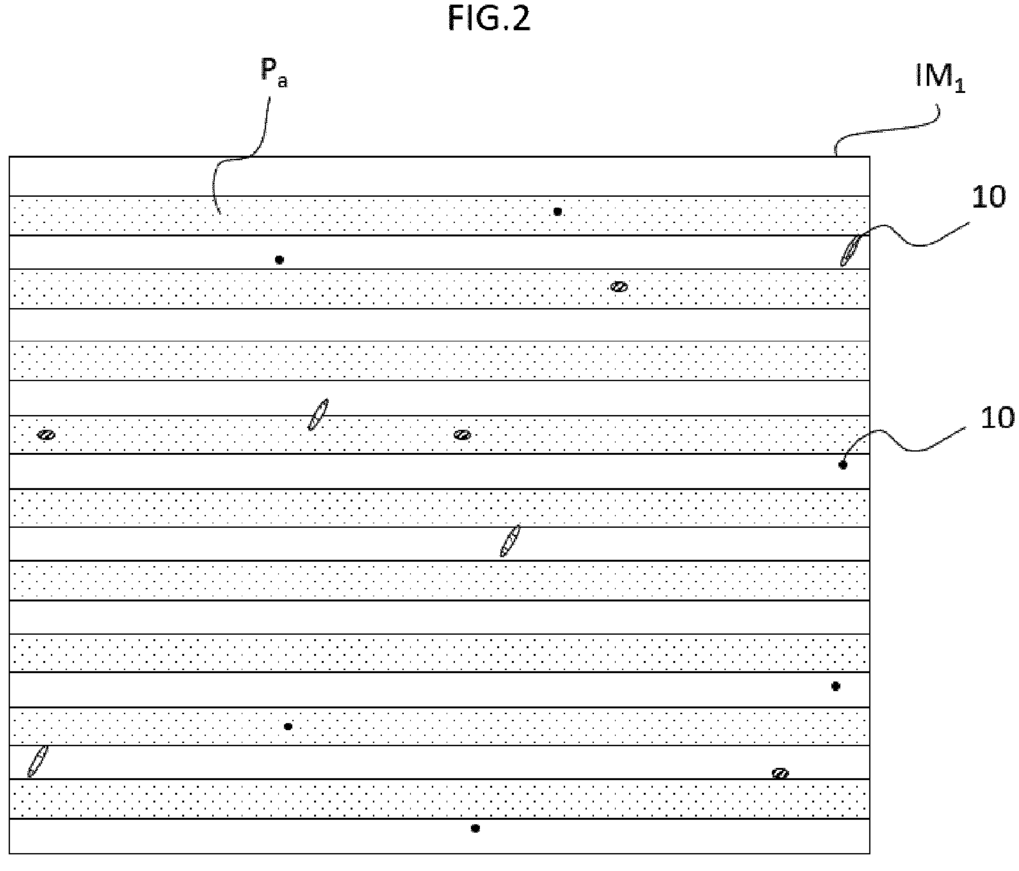
FIG. 3 is a representation of the acquired image of the support after the filtering of a frequency range.

In one embodiment, the first image $IM_1$ is a representation of a support 100 comprising at least one predefined pattern $P_a$, at least one predefined pattern $P_{a1}$ and at least one defect 10. In one example, in reference to FIG. 2, the predefined pattern $P_a$ comprises a mesh, the predefined pattern $P_{a1}$ comprises a repetitive geometrical shape and the defect 10 comprises a hole. In reference to FIG. 3, the first image may comprise a representation of a support 100 comprising several defects 10 such as holes and threads.

In one embodiment, the cameras comprise means for processing the first images $IM_1$. In this case, the first image(s) $IM_1$ processing is/are done locally.

In one embodiment, each first image $IM_1$ is acquired and transmitted to a distant entity, such as a server. In that case, the first cameras comprise for example a memory to store each first image $IM_1$ after its acquisition. In one example, the first images $IM_1$ are sent from the cameras toward the distant entity each time a new image is acquired. This example is particularly advantageous in the case where the cameras do not have enough memory to store a large amount of data. In another example, the first images $IM_1$ acquired are stored and sent to the distant entity each time a threshold of memory is crossed. In another example, the first image $IM_1$ is sent to the distant entity according to a predefined time period.

In one embodiment, several first images $IM_1$ acquired by a plurality of cameras are stitched together. The stitching can be done locally or on another entity on which the first images $IM_1$ have been sent, by using a software in order to gather all the first images $IM_1$. One advantage is to reconstruct a representation of the whole fabric. Another advantage of stitching the images together is to overcome the problems due to the margins of the images. Indeed, due to the uncertainty of the exact locations of the defects on the fabric, the position of a given defect could be exactly on the edge of an acquired image, resulting in poor detection. By stitching several images together and reconstructing a bigger image that contains more information, it is possible to ensure or confirm the presence of a defect onto the fabric.

In one embodiment, the method comprises acquiring the first image $IM_1$ by means of at least one hyperspectral camera. The first image may also be acquired by means of at least one multispectral camera. The camera may be a movable camera.

One advantage is to detect defects in a frequency range other than the visible spectrum, such as infrared or uv.

In one embodiment, the method comprises a step of enlightening the support 100 with a polarized light. In that case, the method may comprise acquiring the first image $IM_1$ with a camera that comprises means to analyze the polarized light, such as a polarizer.

One advantage is to optimize the defect detection on a support with reflective or metallic components, or on a support with any kind of glossy aspect.

In one embodiment, the method comprises a step of acquiring the first image ($IM_1$) according to a High-Dynamic-Range imaging process, also known in literature as "HDR imaging". For example, the method may comprise combining a series of picture with variable exposures.

One advantage is to obtain an image as close to reality as possible in order to best detect the defects on the support.

Another advantage is to obtain images with good contrast when the support 100 is a fabric.

In one embodiment, the method comprises acquiring the first image $IM_1$ by means of a moving area scan camera.

One advantage is to get a better image of a precise area of the support 100, for example when a defect 10 is detected.

In one embodiment, the method comprises adjusting the tension in the support 100. For example, when the support 100 is a fabric, the method may comprise balancing the tension of the fabric between the winder and the unwinder.

In one embodiment, the method comprises a step of generating, by means of a calculator, a command to activate a cooling system. The cooling system may comprise a fan. The cooling system may be activated according to a predefined frequency (for example each 20 minutes) and for a predefined period of time. The cooling system may also be automatically activated when lights are turned on to light the support 100.

In another example, the cooling system is associated with at least one temperature sensor. The method may comprise a step of acquiring temperatures values at a predefined frequency, for example by means of the calculator connected to the sensors. The method may comprise a step of activating the cooling system when the acquired temperatures values are higher than a predefined threshold value.

First Image Treatments

Figure 4:
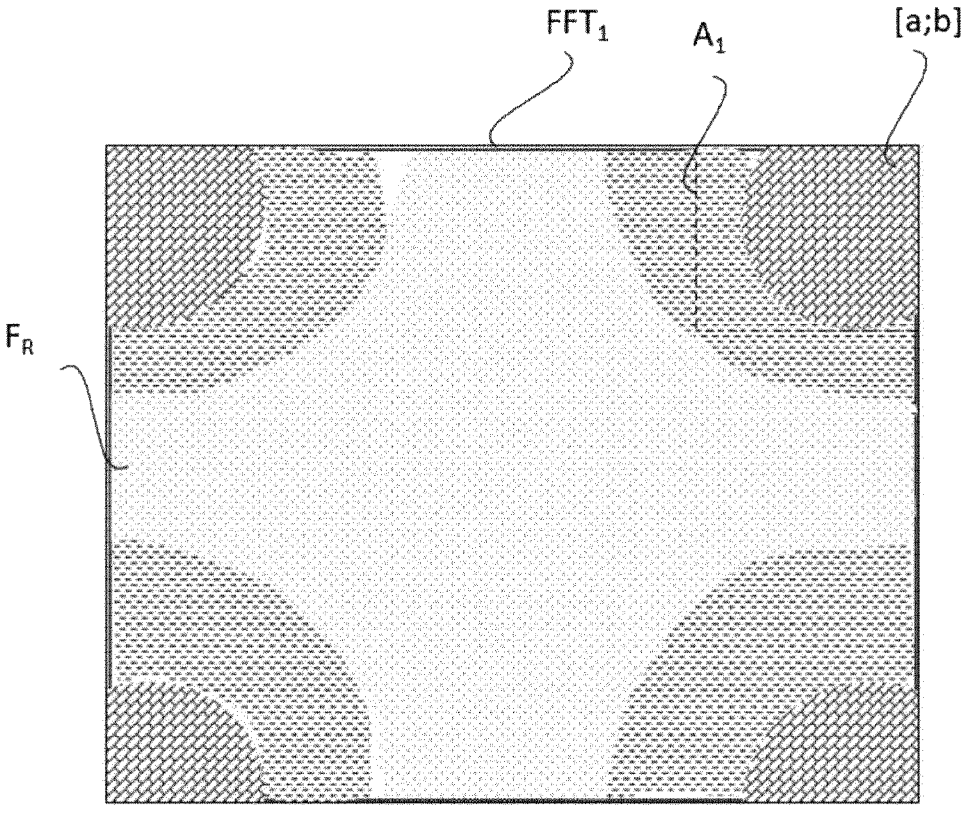
FIG. 4 is a representation of the 2D spectrum space of an acquired image of the support after the filtering of a frequency range.

In one embodiment, in reference to FIG. 4, the method comprises a step of converting the first image $IM_1$ from the spatial domain to the frequency domain. This step is for example implemented by applying Fast Fourier Transform, also known as FFT in the literature, on the first image $IM_1$. One advantage of this step is that applying filters to images in the frequency domain is computationally faster than doing the same in the spatial domain. The first image $IM_1$ is for example decomposed into its real and imaginary components. In that case, the two components are a representation of the first image $IM_1$ in the frequency domain. In one example, the Fast Fourier Transform is applied to remove at least one predefined pattern $P_a$, $-P_{a1}$.

In one embodiment, the method comprises a step of applying a gradient. The gradient is for example applied on a plurality of pixels in the first image $IM_1$ to detect outlines onto said first image $IM_1$. The outlines detected comprise for example outlines of the predefined pattern $P_a$. One example is to use a Sobel filter for the outline detection. The gradient can also be applied to detect changes in colors in the first image $IM_1$. One advantage is that the changing in colors can be due to the presence of a defect 10 onto the fabric 100. Thus, using a gradient in the first treatment $T_1$ can allow to detect a potential defect 10 onto the fabric 100.

In one embodiment, the method comprises a step of histogram equalization.

One advantage is to increase the contrast of several parts of the first image $IM_1$, such as lighted areas.

2D Spectrum Space Representation

In one embodiment, the method comprises generating an image that corresponds to the 2D spectrum space $FFT_1$ of the first image $IM_1$. It should be understood by "2D spectrum space", the two-dimensional spectral representation of the frequencies that characterize the features of the first image $IM_1$. In the present description, the 2D spectrum space FFT1 will be referred to by the appellation "first two-dimensional spectrum space" or "first 2D spectrum space indifferently. The features of the first image $IM_1$ that are represented on the first 2D spectrum space $FFT_1$ corresponds for example to the predefined patterns $P_a$, $P_{a1}$, to one or several defects 10, or to other features of the image such as color frequencies, margins of the first image $IM_1$ or specific geometrical shapes or drawings that does not correspond to a pattern. The transformation of the image to the frequency domain is for example realized by applying a 2-dimensional Fourier transform function. In that case, the 2D spectrum space takes for example the form of a depth map. The function applied is for example a discrete Fourier transform.

In one embodiment, a logarithmic recalibration is applied to the 2D spectrum space $FFT_1$. One advantage of such recalibration is to obtain a better detection of the low frequencies on the 2D spectrum space $FFT_1$. Indeed, the applying of a discrete Fourier transform can lead to a difficulty to visualize the low frequencies on the spectrum space $FFT_1$ as the high frequencies are often the most represented when transforming the first image $IM_1$.

In one embodiment, in reference to FIG. 4, at least one frequency range $F_R$ is filtered on the 2D spectrum space $FFT_1$. The frequency range $F_R$ corresponds for example to a range of high frequencies on the 2D spectrum space.

In one illustrative example, a low pass filter is applied to the 2D spectrum space $FFT_1$. The low pass filter is applied to highlight the low frequencies that could be the spectral representation of potential defects 10 onto the first image $IM_1$. The spectrum space $FFT_1$ that corresponds to the spectral representation of the first image $IM_1$ of the fabric comprises several high frequencies that correspond to repetitive elements on the image such as the predefined patterns $P_a$, $P_{a1}$. The predefined pattern $P_a$ is a repetitive background that corresponds to a mesh or a stitch of the fabric and the predefined pattern $P_{a1}$ is a repetitive element printed on the fabric 100 that appears on the first image $IM_1$, such as a printed yellow duck. Thus, the low-pass filter is applied to suppress the high frequencies of the 2D spectrum space that represent the repetitive details, textures, and the outlines of the first image $IM_1$.

Figure 5:
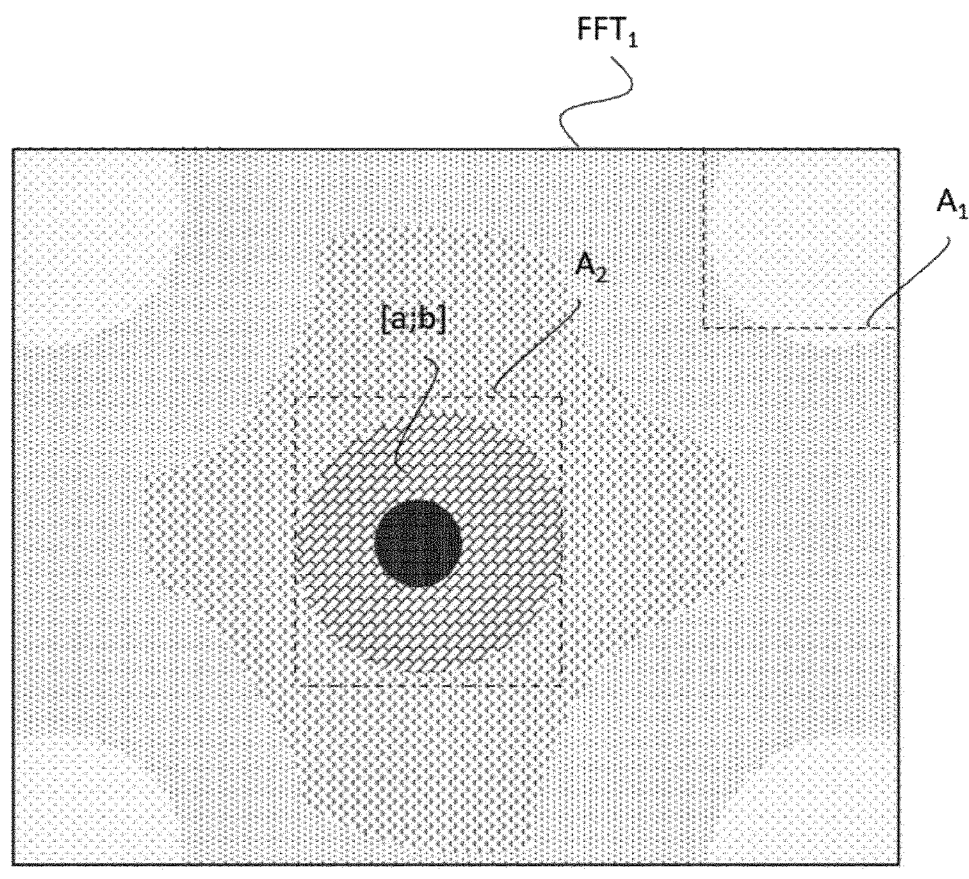
FIG. 5 is a representation of the 2D spectrum space of an acquired image of the support after the shifting of a frequency range to the center of the 2D spectrum space.

In one embodiment, in reference to FIG. 5, the method comprises the shifting of at least one frequency range [a;b] from at least a first area $A_1$ of the 2D spectrum space $FFT_1$ toward a second area of the 2D spectrum space $FFT_1$. The first area $A_1$ corresponds for example to the corners of the 2D spectrum space and the second area corresponds for example to the center of the 2D spectrum space. The frequency range [a;b] selected corresponds for example to the low frequencies of the 2D spectrum space $FFT_1$. Thus, in this example, the most important frequencies that correspond for example to the frequencies of one or several defects 10 are advantageously gathered in the center of the 2D spectrum space.

Figure 6:
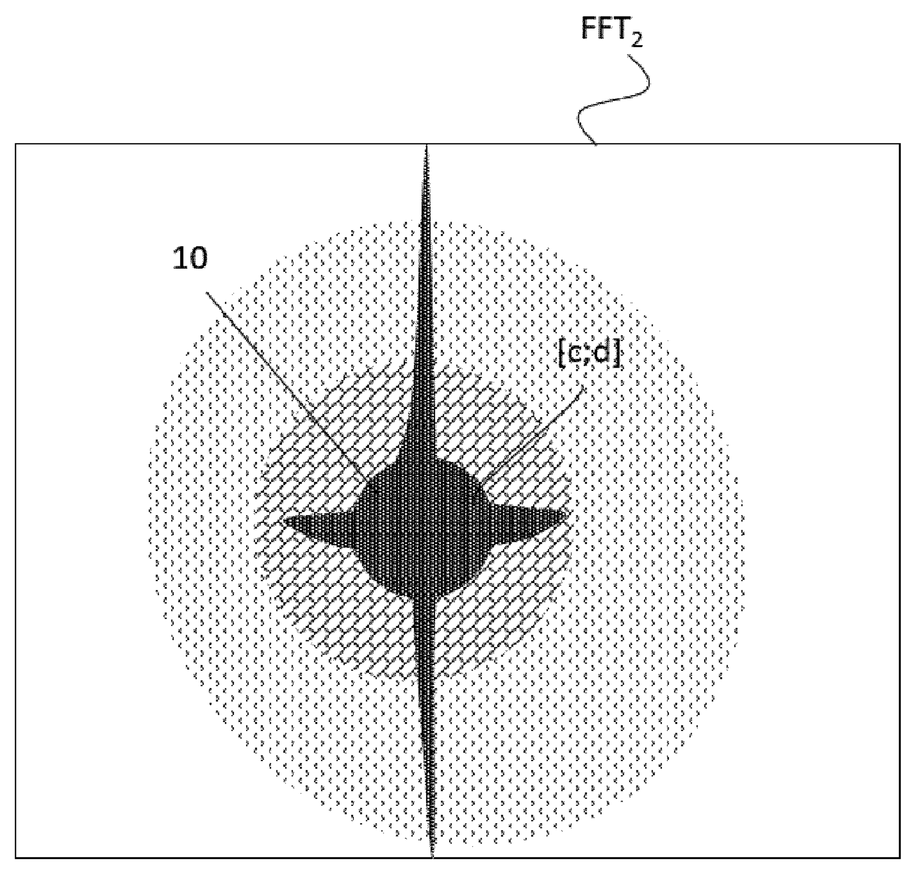
FIG. 6 is a representation of the 2D spectrum space after applying a step of cropping.

In one embodiment, in reference to FIG. 6, the 2D spectrum space FFT is resized in order to generate a second 2D spectrum space $FFT_2$. The second 2D spectrum space $FFT_2$ is for example a downscaled representation of the 2D spectrum space $FFT_1$. In another example, the second 2D spectrum space $FFT_2$ is an upscaled representation of the 2D spectrum space $FFT_1$. The downscaling of the 2D spectrum space $FFT_1$ is for example realized by cropping the spectrum space $FFT_1$. It should be understood that the cropping operation in the frequency domain results in the downscaling of the first image $IM_1$ in the spatial domain.

In one embodiment, the first image $IM_1$ is downscaled by applying a down sampling operation on the 2D spectrum space $FFT_1$. This down sampling operation results for example in the second 2D spectrum space $FFT_2$, which corresponds to a downscaled representation of the first image $IM_1$ in the spatial domain.

In one embodiment, the 2D spectrum space $FFT_1$ is downscaled into a plurality of images. Different filters are for example applied to each downscaled image. For example, a Gabor filter is applied to one image and a gradient is applied to another image. One advantage is to maximize the chances to identify a potential defect 10 onto the first image $IM_1$. Indeed, the gradient is very efficient to detect variation in colors in an image, while other filters such as Gabor filters are more efficient to detect homogeneous parts or specific textures on an image. Thus, one advantage to combining different filters is that it maximizes the chances of detecting one or several specific defects 10, depending on the actual type of defects 10 located in the first image $IM_1$.

In one embodiment, the downsizing of the first spectrum space $FFT_1$ is realized after the shifting of the frequency range [a;b] to an area of the 2D spectrum space $FFt_1$. In one example, the frequency range [a;b] is to the center of the 2D spectrum space $FFT_1$ and the spectrum is then downscaled. Once the 2D spectrum space $FFT_1$ is downscaled, it results in the second 2D spectrum space $FFT_2$ on which specific frequencies have been emphasized.

In one embodiment, the resizing of the 2D spectrum space $FFT_1$ is realized by cropping the 2D spectrum space $FFT_1$. In one example, the frequency range [a;b] is shifted to the center of the spectrum and the 2D spectrum space $FFT_1$ is then cropped to downscale the frequencies in the range [a;b]. In that case, the cropping of the 2D spectrum space $FFT_1$ results in the second 2D spectrum space $FFT_2$. One advantage is to emphasize on the frequencies that have been shifted to the center of the spectrum, that correspond for example to the defects 10 frequencies. Another advantage is to remove the non-desired frequencies by cropping the frequencies that have not been shifted to the second area $A_2$ of the spectrum, and that are consequently not contained in the frequency range [a;b].

In one embodiment, the resizing of the 2D spectrum space $FFT_1$ comprises the enlarging of the 2D spectrum space $FFT_1$. The enlarging step of 2D spectrum space $FFT_1$ is for example realized by applying a padding to said 2D spectrum space. In that case, the applying of a padding to the 2D spectrum space $FFT_1$ results in the second 2D spectrum space $FFT_2$.

Figure 7:
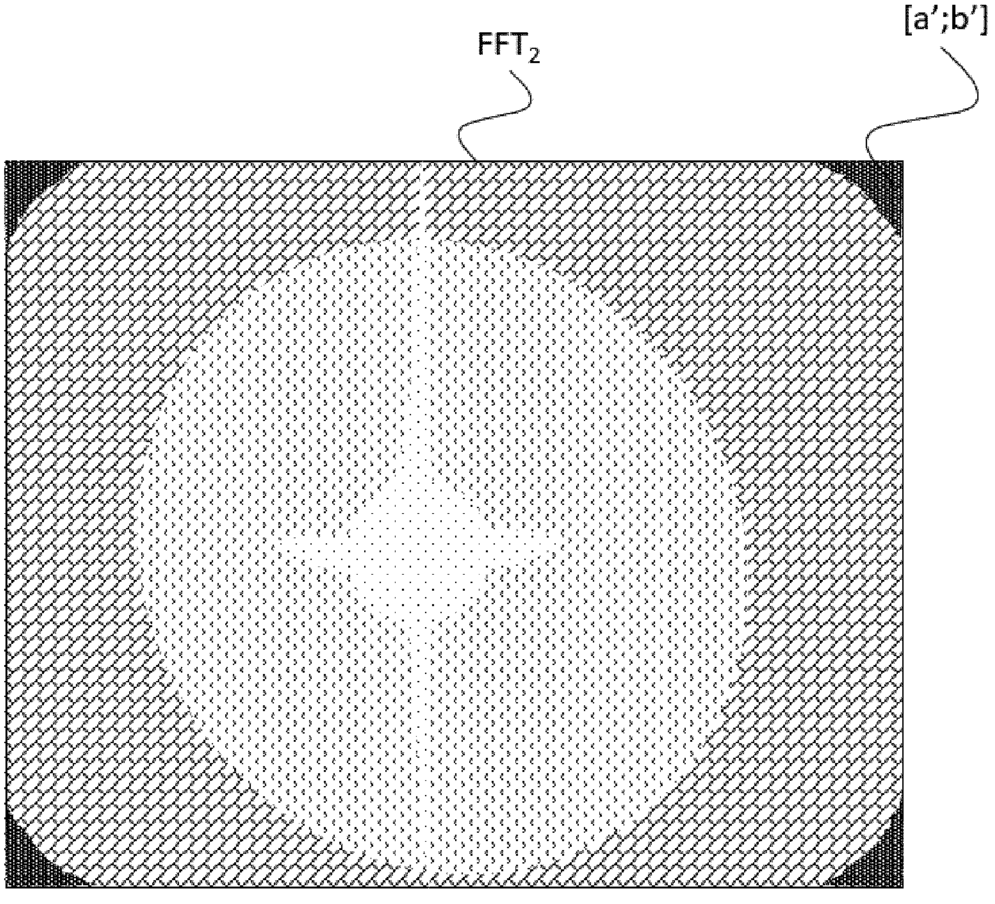
FIG. 7 is a representation of a new 2D spectrum space of an acquired image of the support after the shifting of a frequency range from the center toward the corners of the new 2D spectrum space.

In one embodiment, in reference to FIG. 7, the method comprises shifting at least a selected frequency range [a'; b'] from a second area $A'_2$ of the second 2D spectrum space $FFT_2$ to toward a first area $A'_1$ of the second spectrum space $FFT_2$. The frequency range [a'; b'] can comprise the same frequencies as the frequency range [a;b] or different frequencies. This step can be understood as the reverse shifting operation that has been done with the shifting of the frequency range [a; b] from the first area $A_1$ toward the second area $A_2$ on the 2D spectrum space $FFT_1$. As the second 2D spectrum space $FFT_2$ can comprise different frequencies or less frequencies than the 2D spectrum space $FFT_1$, the new frequency range [a'; b'] is defined.

Reverse Transformation and Final Image

Figure 8:
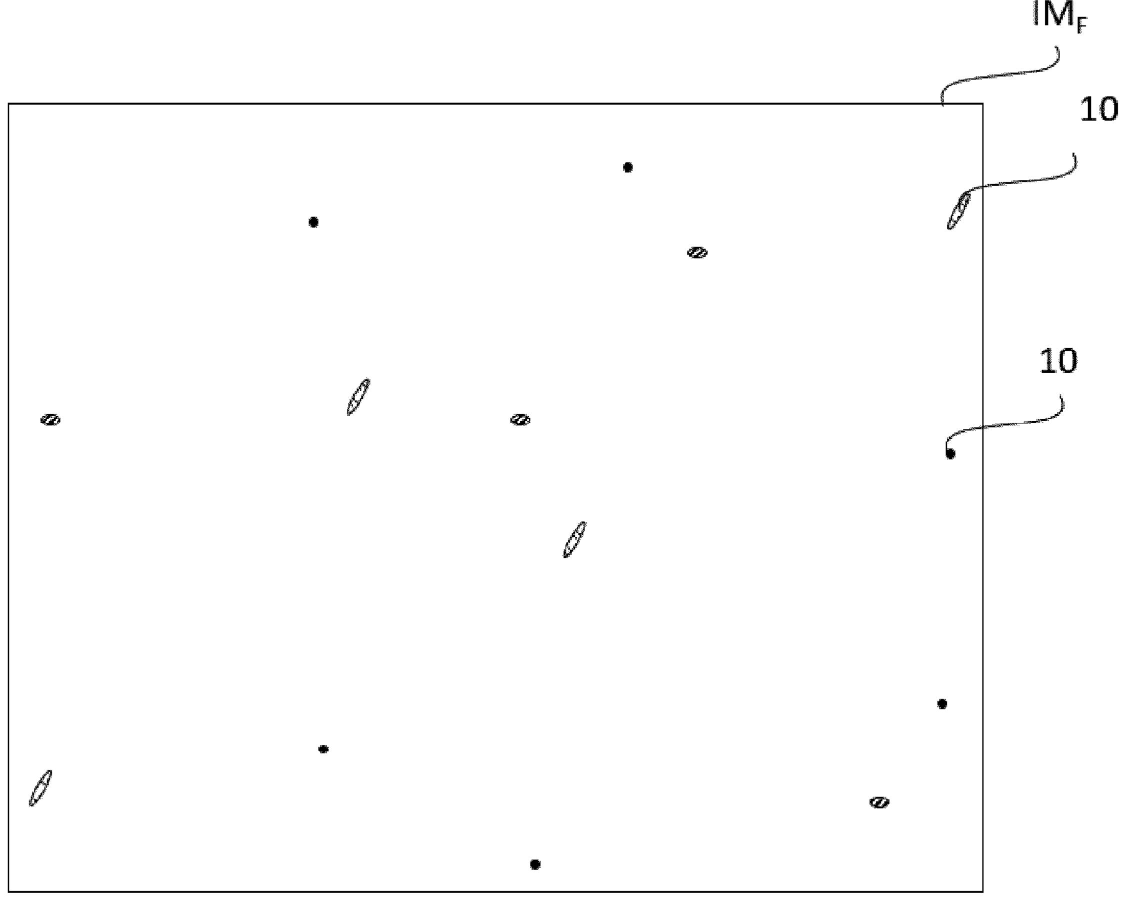
FIG. 8 is a representation of the final image after the applying of treatments to highlight the defects.

In one embodiment, in reference to FIG. 8, the method comprises a step of reversing RVRS the transformation from the frequency domain of the second 2D spectrum space $FFT_2$ to the spatial domain to obtain a final image $IM_F$.

The "final image $IM_F$" may be a frame with a coordinate system, for example a two-dimensional coordinate system, with one or a plurality of locators allowing to localize one or several defects on the frame.

In one embodiment, the final image $IM_F$ comprises a frame and a background generated from a duplication of at least one portion of said final image $IM_F$. The duplicated portion of the final image may comprise a pattern. The pattern may be extracted from the original first image $IM_1$. The pattern may be associated to the final image $IM_F$ as a metadata.

One advantage is to obtain a final image $IM_F$ closer to the first image $IM_1$ on which the defects are still more visible.

In that case, depending on the filters in the frequency domain to the 2D spectrum space $FFT_1$ and the second 2D spectrum space $FFT_2$, the final image $IM_F$ comprises less features than the first image $IM_1$. One advantage is to obtain a final image $IM_F$ on which the defects 10 are emphasized. Advantageously, the defects 10 detection on the surface, for example the fabric, is improved.

Labelling the Images

In one embodiment, a step of labelling the first image $IM_1$ or the final image $IM_F$ is applied. It should be understood by the term "labelling" that the images $IM_1$, $IM_F$ are being annotated.

In one embodiment, the method comprises a step of labelling LAB at least one defect 10 on the final image $IM_F$. The labelling step comprises for example the pixel wise annotation of several parts of the final image $IM_F$. The labelling step is for example done automatically by means of a computer program, after that the final image $IM_F$ has been acquired by a camera and transmitted to a distant entity, such as a computer or a server. In another example, at least one defect 10 is labelled by an operator.

In one embodiment, the labelling LAB of at least one defect 10 on the final image $IM_F$ is realized at pixel precision. One advantage is to detect the precise shape, color, location, and orientation of the defect 10. This step is particularly advantageous in order to classify the defects 10. The defects 10 can be classified depending on criterion defined by a user. In that case, a database can for example be built comprising several defects 10 categories. This database can for example be useful to train a neural network at automatically detecting and classifying the detected defects 10 on the images, depending on specific features such as their shape, their size, their color, their orientation and so on.

In one embodiment, the labelling LAB of at least one defect 10 is applied on the first image $IM_1$. The labelling of the defects 10 is for example applied on the first image $IM_1$ after the final image $IM_F$ has been generated, in order to detect the defects 10 on the first image $IM_1$ more easily. In another example, the labelling LAB of the defects is applied on the first image $IM_1$ after its acquisition by the cameras. This is made possible when the defects 10 are already visible on the first image $IM_1$ and that no further treatments are required in order to identify them.

In one embodiment, the labelling step LAB is applied by means of a trained neural network. The trained neural network is for example a convolutional neural network, also known as CNN in the literature. In another example, the labelling of the first image $IM_1$ is done manually. In that case, the first image $IM_1$ is for example labelled by an operator that has visually localized the defect 10 on the first image $IM_1$.

In one embodiment, the labelling step LAB is applied with pixel precision.

One advantage is to create the labels for instance segmentation, or for object detection to detect a bounding box containing the defect along with its class or category.

Generating a Command

In one embodiment, the method comprises a step of generating a command $C_1$. The command $C_1$ is for example generated after one or several defects 10 have been detected on the first image $IM_1$. The command $C_1$ is for example generated to highlight one or several defects 10 onto the fabric 100 or onto the first image $IM_1$. According to one example, the command $C_1$ generated can comprise displaying at least one defect 10 on a screen. In that case, the displaying of the defect 10 on a screen can for example allow an operator to visualize where the defect 10 is located onto the fabric and allow him to manually fix it. The command $C_1$ can comprise lighting or pointing the defect 10 with a light device. For example, the fabric 100 can be moving along a horizontal path onto a standalone machine that comprises an array of LEDs, and the command $C_1$ comprises stopping the moving of the fabric 100 along its horizontal path and activating specific LEDs at the location of the defect 10 to allow an operator to localize the defect 10 and to fix it.

In one embodiment, the generated command $C_1$ comprises a command to automatically fix a defect 10 onto the fabric 100. Such embodiment is for example made possible when the fabric 100 is moving along a predefined path on a machine that comprises means for automatically fixing a defect. Such means can for example comprise means for brushing the defect 10 when the defects 10 comprises dust, means for washing the fabric 100 when the defects 10 comprises stains or means for cutting the defect 10 when the defects 10 comprises a thread.

In one embodiment, the command $C_1$ generated comprises automatically marking the defect 10 onto the first image $IM_1$. The marking comprises for example annotating a specific location onto the first image $IM_1$ that corresponds to the approximate location of the defect 10. In another example, the marking of the defect 10 comprises marking the outlines of a specific area onto the first image $IM_1$ that corresponds to the area covered by the defect onto the fabric 100. One advantage is to precisely localize the position of the defects 10 onto the fabric 100. For example, if a plurality of first images $IM_1$ are acquired for a specific fabric 100, the defects 10 can be precisely localized on each first image $IM_1$. Thus, when the whole fabric 100 is digitally reconstructed afterward, it is possible to output a mapping of each potential defect 10 that are present on the fabric 100. In another example, the defects 10 are marked automatically by a robot onto the fabric 100. One advantage is to allow an operator to quickly visualize the location of the defect 10 onto the fabric in order to fix it efficiently. Another advantage is that in that case, it is no longer necessary to stop the moving of the fabric 100 each time a defect is detected. The defects 10 detected are marked by the automatic robot and can for example be all fixed after the whole fabric has finished to traveling along its path onto the machine.

In one embodiment, the command $C_1$ generated comprises blowing at least one defect 10. Such command is for example used when the defect 10 comprises dust onto the fabric. In another example, the command $C_1$ generated comprises brushing the defect 10. Such command $C_1$ is for example used when the defect 10 comprises dirt at a specific location onto the fabric 100.

In one embodiment, the command $C_1$ generated comprises automatically cutting or rejecting a part of the support 100. For example, when one or several defects 10 are identified onto a fabric and those defects are identified as non-fixable defects, the part of the support 100 that contains the defects 10 can be cut from the rest of the fabric in order to only keep the usable parts. In the case of the brick, if the brick contains defects such as holes, cracks, or fissures, making it unusable, the brick can be rejected from the line.

In one embodiment, the command $C_1$ generated comprises automatically printing a code encoding data on the support 100, such as a barcode, at a position proximate to a detected defect 10. The code may also be a QR code. The code is for example decodable with an appropriate reader. The data encoded in the code may comprise data associated to a defect 10, for example the closest defect 10 to the code. The data may comprise a shape, a category, a size, or a position of the defect 10. The data may also comprise other features related to the defect 10.

In one embodiment, the command $C_1$ generated comprises automatically printing the code on a lateral edge of the support 100.

In one embodiment, the command $C_1$ generated comprises sticking a label with the code on the support 100.

In one embodiment, the command $C_1$ generated comprises stapling a label with the code on the support 100.

In one embodiment, the command $C_1$ generated comprises printing a colored label comprising the code. The colored label may be chosen depending on the classification of the defect 10. For example, the colored label may be chosen depending on the defect type or depending on its size.

In one embodiment, the method comprises a step of reading the code with a reader configured to decode information encoded in said code. The method may comprise a step of acquiring at least one image of the code at the same time than reading the code with the reader. The reader may be a specific device, or a reader launched through a specific app of a device comprising a camera, such as a smartphone.

In one embodiment, the method comprising a step of positioning at least one graduated object proximate to the support 100. The graduated object may be a ruler. For example, the graduated object may be a graduated ribbon taut along a side of the support 100. The 0 graduation of the graduated object may be advantageously placed at an extremity of the support 100.

One advantage is to localize a defect more precisely on the support. For example, when a code, such as a QR code, is positioned at a defect location, if the code is acquired with an appropriate reader that also captures an image, it is possible to precisely localize the defect on the support due to the presence of the graduation on the image. Such information can be useful for further step of fixing the defect if it is fixable, or further step of cutting the support or other appropriate action if it is not fixable.

In one embodiment, the method comprises a step of automatically activating a command before the step of acquiring the first image $IM_1$. The command activated may comprise a command to automatically remove or fix automatically removable/fixable defects, such as for example a command of blowing the support 100 to remove dust.

In one embodiment, the method comprises a step of transmitting, by means of a communication interface, a plurality of data comprising images of the support 100 comprising defects and comprising images of the support 100 that are defect free to a distant equipment, such as a distant server.

One advantage is to provide different kind of data to train models, such as neural networks.

Learning Function

In one embodiment, the method comprises a step of applying a learning function $F_L$ to at least one first image $IM_1$. The learning function is for example a supervised or an unsupervised method such as an artificial neural network. The artificial neural network is for example a convolutional neural network. The artificial neural network comprises for example several layers such as a convolutional layer, a pooling layer, a dropout layer, a fully connected layer, also known as a dense layer, a softmax layer and an output layer. The neural network may be trained by automatic learning, better known by the expression "machine learning".

In one embodiment, the learning function $F_L$ is trained by using defect features as input data. In that case, the learning function $F_L$ is trained to identify particular defects 10 according to their distinguishing features such as their sizes, their geometrical shapes, their colors, their orientation, or their location onto the support 100.

In one embodiment, the step of applying a learning function $F_L$ comprises the applying of a mask R-CNN. The mask R-CNN is applied in order to identify interest areas on the first image $IM_1$. The interest areas correspond for example to areas wherein the defects are located on the first image $IM_1$. The interest areas have for example a geometric shape with right angles surrounding the defects 10 onto the first image $IM_1$. In another example, the interest areas have the exact shape of each defect 10 located on the first image $IM_1$.

In one embodiment, a step of pooling is applied to the first image $IM_1$. The step of pooling is for example applied during the applying of the mask R-CNN on the first image $IM_1$. The step of pooling is for example applied to extract the interest areas from the first image $IM_1$ and to use them as input data for the next convolutional layer of the network, which is for example a Convolutive Neural Network, also known in the literature through the acronym "CNN". One advantage is to reduce the size of the data given as input data to the neural network in order to reduce the time of calculation in the neural network. Another advantage is to optimize the defect identification and classification in the neural network, in order to improve the training of the neural network.

In one embodiment, the method comprises a classification step of the input data of the learning function $F_L$. The classification step comprises for example a series of mathematical operations, such as matrix operations between an input matrix and a weight matrix trained beforehand by a deep learning method.

In one embodiment, the mask R-CNN is applied in order to classify one or several defects 10 detected onto the support 100.

In one embodiment, the neural network may comprise convolutions layers or fully connected neuron layers. The convolution layers may comprise a scanning of an input matrix producing a series of matrix calculations. The other layers of the neural network may also comprise matrix calculations.

According to one embodiment, each convolution comprises a matrix product between an input matrix, a weight matrix, and an additional bias considered.

The application of a processing by successive layers within the neural network comprises for example the application of a series of matrix mathematical operations which are followed by a function to produce an output layer. The succession of these operations may define the depth of the neural network.

According to one embodiment, the neural network is a multilayer perceptron, known by the acronym MLP. According to one example, the neural network may be a network equivalent to the MLP.

According to one example, the neural network is configured such that the result is invariant by permutation(s) of the points of the input list. This configuration is made possible by using pooling functions such as the functions known by the name "MAX POOLING" or "AVG POOLING".

In one embodiment, at least one detected defect 10 is associated with a probability. The probability associated with the defect 10 is for example a probability that the defect 10 belongs to a given category. This association of a probability to a defect allows classifications of the defects 10 depending on the probability associated to the defect. For example, the highest probability associated to the defect 10 may allow to associate the defect 10 to the category associated to said probability. The categories may comprise a category related to a type of defect, for example a hole, a broken thread, a broken warp, a broken weft, or a crease. The categories may also comprise a size of the defect 10. The categories may also be grouped to form "meta categories" that associate several categories to bigger categories, for example "fixable" or "non-fixable". Examples of fixable defects 10 may comprise dust or stains. Example of non-fixable defects 10 may comprise holes, broken threads, or a wrong printed motif.

One advantage to group categories is to have better results with some defect detection models that work better with a reduced number of categories.

In one embodiment, the method comprises a step of calculating a score of likeness by means of a learning function to classify several defects that belongs to different categories in a same other category. The score of likeness may be calculated automatically by a calculator applying the learning function according to several criterions related to the defects, such as their shape or their size. The learning function may be trained with a preexisting data set or automatically through exploitation.

In one embodiment, the method comprises a step of generating a bounding box map on the first image $IM_1$. The bounding boxes may be of rectangle shapes around the defects 10. One advantage of bounding boxes is to better visualize the size of the defects 10.

In one embodiment, the command $C_1$ is generated depending on at least one parameter among a dimension, a position and/or a shape of the bounding box. For example, a command of automatically cutting the support 100 along the edges of a bounding box may be generated.

In one embodiment, the method comprises a step of zooming on a defect area of the final image $IM_F$.

One advantage is to better identify a shape of a defect when it is to small to be correctly detected by a user.

Defect Map and Digital Image

In one embodiment, the method comprises a step of acquiring frame dimensions of the support 100. In one example, the dimensions of the lateral edges of the support 100 are acquired. Several first images $IM_1$ are for example acquired by means of cameras arranged above the support 100. In the example of a fabric, several images of the fabric are for example acquired until images $IM_1$ of the whole fabric have been acquired. The dimensions of each first image $IM_1$ are for example acquired and computed in a distant entity such as a server. Each first image is for example treated until obtaining a final image $IM_F$ on which the positions, dimensions and types of defects have been identified. In that case, the whole fabric has been computed image by image with the identification of each defect it contains. It is then possible, knowing the frame dimensions of the fabric and the dimensions of each first image $IM_1$, to reconstruct a defect map of the whole fabric. A location is for example assigned to each defect within the frame dimensions of the fabric, with a type of defect, an orientation, and a size.

In one embodiment, the method comprises a step of reconstructing a digital image of the support 100. This step is for example done on a distant entity such as a server on which all the first images $IM_1$ and the final images $IM_F$ of the support 100 are saved. In one example, the first images $IM_1$ of the support 100 are stitched together in order to reconstruct a final digital image that contains the defects 10 and all their features (position, orientation, size, type . . . ) This is for example possible after treating all the acquired first images $IM_1$ of the fabric in order to obtain all the final images $IM_F$ associated on which it is easier to identify the defects 10 and their associated features, and to then position all the defects 10 on the first images $IM_1$ of the fabric which are a more realistic representation of the fabric than the treated images (the final images $IM_F$).

In one embodiment, the method comprises acquiring at least one motif margin $M_M$. The motif margin $M_M$ comprises for example the distance separating two predefined patterns $P_{a1}$. The two predefined patterns $P_{a1}$ are for example two motifs $P_M$ printed on a fabric. The motif margin $M_M$ is for example acquired based on two specific points of the printed motifs depending on their size and their orientation on the fabric. One advantage is to be able to position each printed motif on the fabric when reconstructing the digital image. The motif margins $M_M$ are for example automatically computed after their acquisition.

In one embodiment, the method comprises a step of computing a first margin $F_{M1}$ of the support 100. The first margin of the support $F_{M1}$ is for example a distance measurement between a longitudinal edge of the support 100 and at least one printed motif. The distance measurement corresponds for example to a distance between the longitudinal edge of the support and a central point of the motif. One advantage is to be sure to place the motif correctly, for example when reconstructing a digital image of the fabric. Indeed, by computing the distance between the longitudinal edge of the support 100 and a central point of the motif, knowing another dimension such as the distance between the motif and a lateral edge of the support 100, it is possible to place the motif correctly independently of its orientation on the support 100. The first margin $F_{M1}$ of the support is for example computed automatically. The computation of the first margin $F_{M1}$ of the support 100 is for example done automatically on a distant entity such as a server. Another example is the case where the cameras comprise means of calculation and can automatically calculate a first support margin $F_{M1}$ after the acquisition of a first image $IM_1$. In that case, the cameras comprise for example a transmission interface to send the acquired first image $IM_1$ to a distant entity with several information on said first image $IM_1$ such as dimensions of the image, dimensions of printed motifs, first support margin $F_{M1}$, colors of features of the image.

In one embodiment, the first support margin $F_{M1}$ comprises the distance between a longitudinal edge of the support 100 and at least one defect 10. In that case, the first margin $F_{M1}$ comprises for example the distance between the longitudinal edge of the support 100 and one specific point of the defect 10 such as a central point of the defect 10. Thus, it is also possible to place the defect 10 correctly when reconstructing a digital image of the support, knowing another dimension such as the distance between the lateral edge of the support 100 and the defect 10, independently of the orientation and the type of said defect 10.

In one embodiment, the method comprises a step of computing a second margin $F_{M2}$ of the support 100. The second margin $F_{M2}$ of the support comprises for example a distance between a lateral edge of the support 100 and one point of a printed motif.

In one embodiment, the second margin $F_{M2}$ of the support 100 comprises a distance between at least one defect 10 and a lateral edge of the support 100. In that case, the second margin $F_{M2}$ comprises for example the distance between the lateral edge of the support 100 and one specific point of the defect 10 such as a central point of the defect 10.

In one embodiment, the method comprises a step of computing at least one predefined pattern $P_a$, $P_{a1}$, $P_{a2}$ of the support 100.

In one embodiment, the method comprises a step of generating a digital image of the support 100 by superposing the defect map and the reconstructed image within the frame dimensions. The defect map comprises for example the location, orientation, size, and type of all the defects 10 of the support. The digital image is for example reconstructed by stitching all the first images $IM_1$ or all the final images $IM_F$ together. The reconstructed image if for example reconstructed based on the computed margins $F_{M1}$, $F_{M2}$ in order to place the predefined patterns $P_a$, $P_{a1}$, and the defects 10 according to the lateral and longitudinal edges of the support.

In one embodiment, the method comprises a step of automatically marking a position of a detected defect on the final image $IM_f$.

In one embodiment, the method comprises a step of automatically detecting a shape of a detected defect on the final image $IM_f$.

In one embodiment, the method comprises a step of displaying at least one defect image on the final image $IM_F$. The defect image may be displayed in response to a command of an operator on an input interface of a displayer which displays the final image $IM_F$. For example, the operator may select a defect area and the calculator may generate a command of displaying a defect image corresponding to the defect area.

One advantage is for an operator to visualize more precisely the details of a specific defect.

The defect images are for example acquired on the support 100 by means of one or several cameras using the position of the defects indicated on the final image $IM_F$.

One advantage is to visualize interest areas clearly without having to digitalize the whole support.

Device for Detecting Defects on a Fabric

Figure 9:
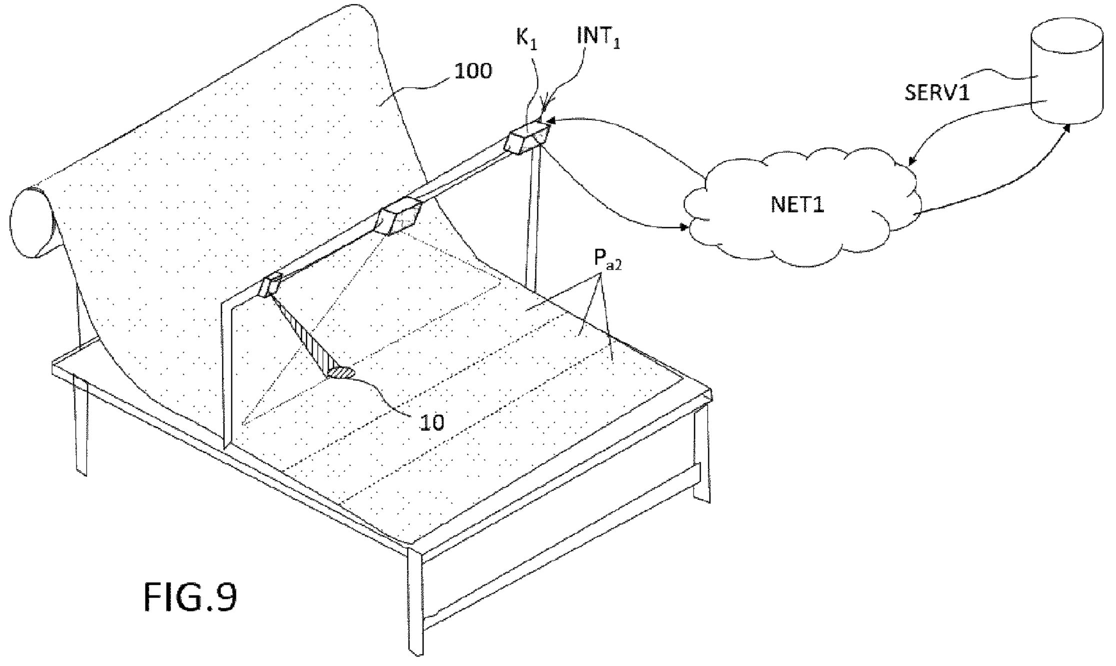
FIG. 9 is a representation of a device for detecting defects on a support.

According to another aspect, in reference to FIG. 9, the invention relates to a device for detecting defects on a support capable of executing any of the steps of the method according to the first aspect of the invention.

The device may comprise at least one camera for acquiring the first image, a calculator, and a communication interface to exchange data with at least one distant equipment, such as a server.

The device may comprise a plurality of cameras, for example several line scan cameras.

The device may comprise tensing means to adjust the tension in the support 100.

The device may comprise rollers to allow the support 100 to move along a predefined path.

The device may comprise a lighting system to light the support 100. The lighting system may for example comprise LED illuminators.

The device may comprise means for fixing the fixable defects, such as a blower, for example to remove dust from the support. The means for fixing the fixable defects may be activated in response to the first command $C_1$ generated by the calculator.

The device may comprise an encoder. One advantage of the encoder is to read movement of the support.

The device may comprise brackets. The device may for example comprise lateral brackets. One advantage is to adjust the device to several type of installations.

The device may comprise a printer, for example to automatically print a code on a lateral edge of the support 100, such as a QR code, in response to the first command $C_1$ generated by the calculator. The device may also comprise sticking means, such as a stickler, or stapling means, such as a stapler, to attach a label comprising the code on the support 100.

The device may comprise supporting means. The supporting means may comprise fixing means to fix one or several cameras or to fix one or several lights. For example, the supporting means may comprise a bar on which are fixed several line scan cameras and several LED illuminators.

The device may comprise a display element. The display element may be a screen, for example a tactile screen. The display element may be configured to display the final image $IM_F$ or first images $IM_1$ acquired by means of the cameras.

The display element may comprise an input interface to allow interactions with a user. In the case where the display element is a tactile screen, the user may interact directly with said tactile screen, for example by touching it. The interactions of the user may cause generation of requests to be treated by a calculator to output a particular command. The interactions of the user may also cause displaying of other features on the display element, such as the displaying of a line following the user movement on the screen when the screen is a tactile screen. For example, the display element may display an image of the support 100 comprising defect areas, and the user may interact with the display element to surround the defect, underline it, highlight it, or to annotate it.

One advantage is to provide the operators with a precise image of the location of the defects on the support, for example to ease fixing the defects when possible, or for removing a specific support part when the defect is not fixable.

The device may be configured to cooperate with a production line comprising means to allow moving a support 100, such as rollers. In that case, the device may be considered as an add-on device allowing to detect defects 10 on a support 100 moving through a production line. In that case, the device may only comprise the support on which are fixed the cameras and the lights, the calculator, the communication interface and the display element.

Computer Program

According to another aspect, the invention relates to a computer program comprising instructions, which, when said computer program is executed on a computer, leads it to execute steps of the method according to the first aspect of the invention.

The invention claimed is:

1. A method for detecting at least one defect on a support, the method comprising:

acquiring at least one first image of the support;

generating a first two-dimensional spectrum space of the at least one first image, the first two-dimensional spectrum space comprising a two-dimensional spectral representation of frequencies that characterize features of the first image;

filtering at least one frequency range of the first two-dimensional spectrum space to remove at least one predefined pattern;

selecting at least one first frequency range in the first two-dimensional spectrum space;

shifting the selected frequency range from at least a first area of the first two-dimensional spectrum space toward a second area of the first two-dimensional spectrum space;

resizing the first two-dimensional spectrum space, generating a second two-dimensional spectrum space on a second frequency range by applying at least one step among the following steps:

downscaling or cropping the first image to output a desired downscaled image, respectively a cropped image or;

upscaling or enlarging the first image with a margin or padding to output a desired upscaled image, respectively an enlarged image;

selecting a third frequency range in the second two-dimensional spectrum space;

shifting the third frequency range from a second area of the second two-dimensional spectrum space toward a first area of the second two-dimensional spectrum space;

reversing the transformation of the frequency domain of the second two-dimensional spectrum space to obtain a final image;

detecting at least one defect on the final image;

labelling each defect on the first image, and generating at least one command after detecting the at least one defect.

2. The method according to claim 1, wherein the at least one command comprises marking an edge of the support with a code encoding a position of the defect on the support and encoding a classification associated to the defect.

3. The method according to claim 1 further comprising applying at least one learning function to the first image to output at least one probability associated to the defect detected in the first image, said probability being associated to a class of a classifier.

4. The method according to claim 3, wherein the command generated depends on class associated to the highest probability associated with the defect detected on the support.

5. The method according to claim 3, wherein the probability associated to the defect is a probability that the defect is a fixable defect or a non-fixable defect.

6. The method according to claim 1, wherein the at least one command comprises at least one of the following:

- displaying the at least one defect on a screen;
- lighting/pointing the at least one defect with a light device;
- generating an alarm by emitting a digital sound and/or lighting a visual alert;
- automatically logging to a distant server and generating a digital notification comprising at least the spatial coordinate of at least one defect;
- stopping a machine;
- automatically fixing the at least one defect;
- marking/labelling the at least one defect with an automatic robot;
- blowing the at least one defect;
- automatically cutting, removing, rejecting or avoiding at least a part of the support,
- brushing the at least one defect.

7. The method according to claim 1 further comprising:

- acquiring frame dimensions of at least the lateral edges of the support,
- calculating a defects map within the frame dimension by assigning to each defect a location within the frame dimension.

8. The method according to claim 1, wherein the at least one predefined pattern comprises whether:

- A stitch characterized by a repetition of a shape or by a symmetric geometrical shape,
- A junction pattern between several pieces of the support.

9. The method according to claim 1, wherein the at least one predefined pattern comprises a repetitive printed motif defined by colorimetric features and/or geometrical features.

10. The method according to claim 3, further comprising:

- automatically computing at least one motif margin, said motif margin comprising at least one distance measurement separating two printed motifs;
- automatically computing a first support margin, said first support margin comprising at least one distance measurement between a longitudinal edge of the support and at least one point the printed motif;
- automatically computing a second fabric margin, said second fabric margin comprising at least one distance measurement between a lateral edge of the support and at least one point of the printed motif,
- generating a reconstructed image of the support by aggregating each printed motif and the stitch, said reconstructed image having proportional dimensions with the frame dimensions;
- generating a digital image of the support by superposing the defects map and the reconstructed image within the frame dimensions.

11. The method according to claim 3, further comprising applying a learning function by a calculator to calculate a score of likeness between at least two defects belonging to at least two different categories in order to classify said two defects in a same new category, the score of likeness being calculated according to common features of the defects.

12. The method according to claim 1, wherein the labelling of each defect on the first image is done with pixel precision.

13. A device for detecting at least one defect on a fabric, said device comprising:

- at least one camera for acquiring at least one first image of the support and for detecting at least one margin information and one dimension of the fabric;
- a calculator for:
  - generating an image that corresponds to a first two-dimensional spectrum space of the at least one first image;
  - filtering at least one frequency range of the first two-dimensional spectrum space to remove at least one predefined pattern of the support;
  - selecting at least one first frequency range on the first two-dimensional spectrum space;
  - shifting the selected first frequency range from at least a first area of the first two-dimensional spectrum space toward a second area of the first two-dimensional spectrum space;
  - resizing the first two-dimensional spectrum space by applying at least one step among the following steps:
    - downscaling or cropping the first image to output a desired downscaled image or;
    - upscaling or enlarging the first image with a margin or padding to output a desired enlarged image;
  - generating a second two-dimensional spectrum space on a second frequency range;
  - selecting a third frequency range in the second two-dimensional spectrum space;
  - shifting the selected frequency range from a second area of the second two-dimensional spectrum space toward a first area of the second two-dimensional spectrum space;
  - reversing the transformation of the frequency domain of the second two-dimensional spectrum space to obtain a final image;
  - detecting at least one defect on the final image;
  - labelling each defect on the first image, said labelling being applied at pixel precision, and
  - generating at least one command after detecting the at least one defect;
- at least one communication interface for exchanging data with a local equipment, a distant equipment or a server.

14. A non-transitory computer readable medium comprising instructions which, when said is instructions are executed on a computer, leads it to execute the following steps:

- generating an image that corresponds to a first two-dimensional spectrum space of the at least one first image;
- filtering at least one frequency range of the first two-dimensional spectrum space to remove at least one predefined pattern of the support;
- selecting at least one first frequency range in the first two-dimensional spectrum space;
- shifting at least one selected first frequency range from at least a first area of the first two-dimensional spectrum space toward a second area of the first two-dimensional spectrum space;

resizing the first two-dimensional spectrum space by applying at least one step among the following steps:

downscaling or cropping the first image to output a desired downscaled image or;

upscaling or enlarging the first image with a margin or padding to output a desired enlarged image;

generating a second two-dimensional spectrum space on a second frequency range;

selecting at least one third frequency range in the second frequency range;

shifting the third frequency range from a second area of the second two-dimensional spectrum space toward a first area of the second two-dimensional spectrum space, and reversing the transformation of the frequency domain of the second two-dimensional spectrum space to obtain a final image.

15. The non-transitory computer readable medium according to claim 14, comprising instructions which, when said instructions are executed on a computer, leads it to execute the following steps:

automatically computing at least one motif margin, said motif margin comprising at least one distance measurement separating two printed motifs;

automatically computing a first support margin, said first support margin comprising at least one distance measurement between a longitudinal edge of the support and at least one point the printed motif;

automatically computing a second fabric margin, said second fabric margin comprising at least one distance measurement between a lateral edge of the support and at least one point of the printed motif;

generating a reconstructed image of the support by aggregating each printed motif and the stitch, said reconstructed image having proportional dimensions with the frame dimensions, and generating a digital image of the support by superposing the defects map and the reconstructed image within the frame dimensions.

16. The method according to claim 1, wherein the support is a fabric or a brick.

* * * * *